United States Patent
Wu et al.

(10) Patent No.: US 9,443,286 B2
(45) Date of Patent: Sep. 13, 2016

(54) GRAY IMAGE PROCESSING METHOD AND APPARATUS BASED ON WAVELET TRANSFORMATION

(71) Applicant: Fujitsu Limited, Kawasaki (JP)

(72) Inventors: Jianrong Wu, Beijing (CN); Xuan Fu, Beijing (CN); Zheng Wang, Beijing (CN); Akihiro Higashi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 14/228,729

(22) Filed: Mar. 28, 2014

(65) Prior Publication Data

US 2014/0294318 A1    Oct. 2, 2014

(30) Foreign Application Priority Data

Mar. 29, 2013  (CN) .......................... 2013 1 0109326

(51) Int. Cl.
*G06K 9/40*  (2006.01)
*G06T 5/00*  (2006.01)
*G06T 5/10*  (2006.01)

(52) U.S. Cl.
CPC ............... *G06T 5/002* (2013.01); *G06T 5/10* (2013.01); *G06T 2207/20016* (2013.01); *G06T 2207/20064* (2013.01)

(58) Field of Classification Search
CPC ..................... G06T 5/002; G06T 5/10; G06T 2207/20016; G06T 2207/20064
USPC ................. 382/254, 305, 264, 191
See application file for complete search history.

(56) References Cited

U.S. PATENT DOCUMENTS

| | | | | |
|---|---|---|---|---|
| 5,602,760 A * | 2/1997 | Chacon | ................ | G01S 3/7864 342/159 |
| 5,799,100 A * | 8/1998 | Clarke | ................ | G06T 7/0012 382/132 |
| 6,285,798 B1 * | 9/2001 | Lee | ................ | G06T 5/004 382/260 |
| 7,020,314 B1 * | 3/2006 | Suri | ................ | G06K 9/527 382/130 |
| 2002/0168109 A1 * | 11/2002 | Shinbata | ................ | G06T 5/009 382/191 |
| 2003/0031369 A1 * | 2/2003 | Le Pennec | ................ | G06T 9/007 382/232 |
| 2004/0258104 A1 * | 12/2004 | Li | ................ | H04N 19/70 370/537 |
| 2005/0196060 A1 * | 9/2005 | Wang | ................ | H04N 19/63 382/240 |
| 2009/0136112 A1 * | 5/2009 | Bismuth | ................ | G06T 5/002 382/132 |
| 2011/0026791 A1 * | 2/2011 | Collins | ................ | G06K 9/62 382/131 |
| 2011/0268328 A1 * | 11/2011 | Bar-Aviv | ................ | G06T 5/50 382/128 |
| 2014/0086504 A1 * | 3/2014 | Arai | ................ | H04N 19/18 382/246 |
| 2014/0233826 A1 * | 8/2014 | Agaian | ................ | A61B 5/7267 382/133 |
| 2015/0339806 A1 * | 11/2015 | Wu | ................ | H04N 5/213 382/260 |

* cited by examiner

*Primary Examiner* — Mekonen Bekele (74) *Attorney, Agent, or Firm* — Staas & Halsey LLP (57) ABSTRACT

The embodiments provide an image processing method and apparatus, which combine a wavelet transform method with a non-local means method, comprising: performing N-level decomposition of an original gray image by using a wavelet transform method; and performing non-local means processing and wavelet reconstruction of each level of components one by one starting from an N-th level, so as to obtain a processed gray image. The image processing method and apparatus can effectively remove various image noises, and well reserve the image details.

20 Claims, 8 Drawing Sheets

GRAY IMAGE PROCESSING METHOD AND APPARATUS BASED ON WAVELET TRANSFORMATION

CROSS-REFERENCE TO RELATED APPLICATIONS

This application claims the benefit of Chinese Application No. 201310109326.3, filed Mar. 29, 2013, the disclosure of which is incorporated herein by reference.

BACKGROUND

1. Field

The embodiments relate to the field of image processing, and particularly, to a gray image processing method and apparatus.

2. Description of the Related Art

Currently, with the popularization and development of the electronic devices such as digital camera and scanner, the digital images can be easily obtained. However, any physical sensor (e.g., thermal sensor, electric sensor, or other type of sensor) will be influenced by noises at certain extent, and those noises influence the signal measurement authenticity. As a result, any image data obtained includes signals and noises. Various image-related applications, such as medical image analysis, image segmentation and object detection, usually require an effective noise suppression method to further obtain a reliable result. Thus, the image filtration has become one of the most important and extensive research topics about image processing and computer vision. The gray image is one type of image significant and widely used, so its noise suppression method is very important.

In the prior art, in order to denoise the image, many methods such as wavelet threshold method, non-local means method, Gaussian filtering method, and bilateral filtering method have been tried to filter the gray image.

In which, the wavelet threshold method applies a wavelet transform to the original image to transform it into the wavelet domain, and filters multi-channel wavelet coefficients by using a threshold method, wherein the wavelet coefficients usually include a slash detail coefficient, a horizontal detail coefficient and a vertical detail coefficient in the decomposition of level 1. At present, a known threshold method is the hard threshold, which sets all the detail coefficients within a range from zero to a set value, and finally, all the wavelet coefficients after the threshold setting are returned to the image domain through an inverse wavelet transform. This method can suppress noises, but some image details will also be suppressed.

The non-local means method is a non-linear edge reservation filtering method, which calculates a weighted sum of the input pixels as each output pixel. Due to the collection of the input pixels, one output pixel may originate from a large area of the input image, and then become "non-local". One key feature of the non-local means method is that the weighted value is determined by the distance between the small image blocks. The method can reserve the image details and effectively suppress the Gaussian noise. However, in some practical applications, other noises besides the Gaussian noise are also existed, and they cannot be effectively removed by using this method.

The Gaussian filtering method is a weighted means method and each output pixel is set as a weighted means of around pixels, wherein the weighted value of the original pixel is the maximum, and the weighted values of around pixels gradually decrease with the increase of the distance away from the original pixel. The method can reduce the noises by smoothing the image, but the image details are also degraded.

The bilateral filtering method is a smooth filtering method of edge reservation and noise reduction, and the brightness value of each pixel in the image is replaced by the weighted means of the brightness values of adjacent pixels. The method is based on Gaussian distribution, and the key is that those weighted values are based on not only the Euclidean distance, but also the radiation difference. The method can reserve the sharp edges through each traverse pixel of the system and corresponding weighted values of adjacent pixels. However, if the image has high noises, the method will distort the image edges.

It is clear that none the existing methods can well reserve the image details while effectively removing various image noises.

To be noted, the above introduction to the technical background is just made for the convenience of clearly and completely describing the technical solutions, and to facilitate the understanding of a person skilled in the art. It shall not be deemed that the above technical solutions are known to a person skilled in the art just because they have been illustrated in the Background section.

SUMMARY

Additional aspects and/or advantages will be set forth in part in the description which follows and, in part, will be apparent from the description, or may be learned by practice of the embodiments.

The objective of the embodiments is to provide a gray image processing method and apparatus, which are capable of effectively removing various image noises, and well reserving the image details.

According to an aspect of the embodiments, a gray image processing method is provided, including: performing N-level decomposition of an original gray image by using a wavelet transform method; and processing each level of components one by one starting from an N-th level, so as to obtain a processed gray image; wherein the processing each level of components in N levels includes: performing non-local means processing to all the pixels of a first component, a second component, a third component and a fourth component of the current level, and performing wavelet reconstruction of the four non-local means processed components, so as to obtain a first component of a level preceding the current level; wherein the performing non-local means processing to one of all the pixels of a first component, a second component, a third component and a fourth component of the current level comprises: performing non-local means processing to one pixel of the first component of the current level, so as to obtain a pixel value of the non-local means processed pixel and a weighted value matrix of pixels within a predetermined search range around the pixel, wherein the weighted value matrix is an R×R matrix, R denoting the number of the pixels within the predetermined search range, which is an integer greater than or equal to 1; and using the weighted value matrix to respectively calculate pixel values of the non-local means processed pixels in the second component, the third component and the fourth component of the current level corresponding to the pixel in the first component; or the processing each level of components in the N levels comprises: performing non-local means processing to all the pixels of the first component of the current level, and performing wavelet reconstruction of the non-local means processed first component, second component, third component and fourth component, so as to obtain a first component of a level preceding the current level; wherein N is greater than or equal to 1, and when the current level is the N-th level, the first component of the current level is a first component obtained after the N-th level decomposition; and when N is greater than 1 and the current level is not the N-th level, the first component of the current level is a first component obtained after processing a component of a level next to the current level; and when N is greater than 1, manners for processing the components of different levels in the N levels are identical or different.

According to another aspect of the embodiments, a gray image processing apparatus is provided, including: a decomposing unit configured to perform N-level decomposition of an original gray image by using a wavelet transform method; and a processing unit configured to process each level of components one by one starting from an N-th level, so as to obtain a processed gray image; wherein the processing each level of components in N levels by the processing unit comprises: performing non-local means processing to all the pixels of a first component, a second component, a third component and a fourth component of the current level, and performing wavelet reconstruction of the four non-local means processed components, so as to obtain a first component of a level preceding the current level; wherein the performing non-local means processing to one of all the pixels of a first component, a second component, a third component and a fourth component of the current level by the processing unit comprises: performing non-local means processing to one pixel of the first component of the current level, so as to obtain a pixel value of the non-local means processed pixel and a weighted value matrix of pixels within a predetermined search range around the pixel, wherein the weighted value matrix is an R×R matrix, R denoting the number of the pixels within the predetermined search range, which is an integer greater than or equal to 1; and using the weighted value matrix to respectively calculate pixel values of the non-local means processed pixels in the second component, the third component and the fourth component of the current level corresponding to the pixel in the first component; or the processing each level of components in the N levels by the processing unit comprises: performing non-local means processing to all the pixels of the first component of the current level, and performing wavelet reconstruction of the non-local means processed first component, second component, third component and fourth component, so as to obtain a first component of a level preceding the current level; when N is greater than or equal to 1 and the current level is the N-th level, the first component of the current level is a first component obtained after the N-th level decomposition; and when N is greater than 1 and the current level is not the N-th level, the first component of the current level is a first component obtained after processing a component of a level next to the current level; and when N is greater than 1, manners for processing the components of different levels in the N levels are identical or different.

The embodiments have the following beneficial effects: effectively removing various image noises, and well reserving the image details.

The subsequent descriptions and drawings disclose the particular embodiments in detail to indicate the ways of employing the principle of the embodiments. It shall be appreciated that the scope of the embodiments of the invention is not limited thereto, and those embodiments comprise many changes, modifications and equivalents within the scope of the spirit and the clauses of the accompanied claims.

Features described and/or illustrated with respect to one embodiment can be used in one or more other embodiments in a same or similar way, and/or by being combined with or replacing the features in other embodiments.

To be noted, the term "comprise/include" used herein specifies the presence of feature, element, step or component, not excluding the presence or addition of one or more other features, elements, steps or components or combinations thereof.

BRIEF DESCRIPTION OF THE DRAWINGS

Many aspects of the embodiments will be understood better with reference to the following drawings. The parts in the drawings are not drafted in proportion, and the emphasis lies in clearly illustrating the principle of the embodiments. For the convenience of illustrating and describing some portions, corresponding portions in the drawings may be enlarged or narrowed. The elements and features illustrated in one drawing or embodiment may be combined with elements and features illustrated in one or more other drawings or embodiments. In addition, the similar reference signs denote corresponding parts in several drawings, and they can be used to denote corresponding portions in more than one embodiment. In which.

DETAILED DESCRIPTION

Reference will now be made in detail to the embodiments, examples of which are illustrated in the accompanying drawings, wherein like reference numerals refer to the like elements throughout. The embodiments are described below to explain the embodiments by referring to the figures.

The above and other features will be more obvious through the following descriptions with reference to the drawings. The descriptions and the drawings specifically disclose the particular embodiments, which are some of the embodiments capable of adopting the principle of the embodiments. To be noted, the embodiments are not limited to the described embodiments. On the contrary, the embodiments include any amendment, modification and equivalent falling within the scope of the accompanied claims.

Currently, the image processing method in the prior art cannot well reserve the image details while effectively removing various image noises. The embodiments provide an image processing method based on a wavelet transform and improved non-local means hybrid structure, which combines the wavelet transform method and the non-local means method, so as to well reserve the image details while effectively removing various image noises.

The image processing method and apparatus of the embodiments are described in detail as follows with reference to the drawings.

Embodiment 1

Figure 1:
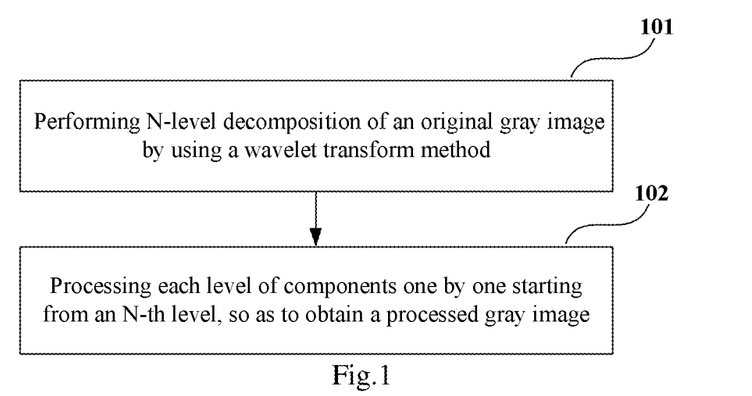
FIG. 1 is a flowchart of an image processing method in Embodiment 1.

FIG. 1 is a flowchart of an image processing method in Embodiment 1. As shown in FIG. 1, the method comprises:

Step 101: performing N-level decomposition of an original gray image by using a wavelet transform method.

In the embodiment, any of the existing wavelet transform methods may be used to perform a decomposition of the gray image. For example, the decomposition of the original gray image may be performed by using a lifting wavelet transform method, but the embodiment is not limited thereto.

Figure 5:
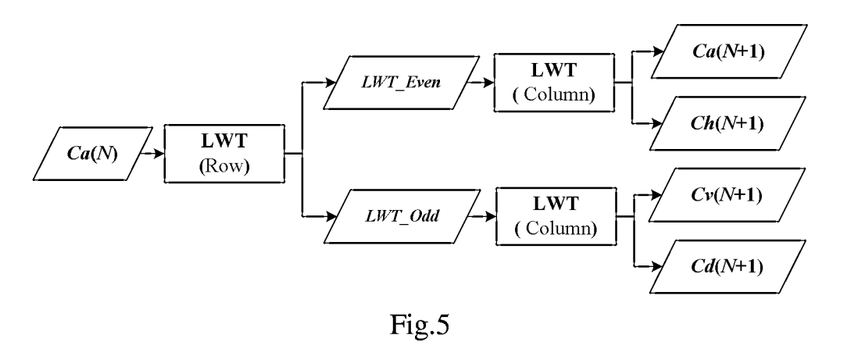
FIG. 5 is a flowchart of a decomposition of a gray image by using a lifting wavelet transform in Embodiment 1.

In the embodiment, the decomposition may be performed by using the method as shown in FIG. 5. The processing procedure will be described as later, and herein is omitted.

The following components are obtained after performing the N-level decomposition of the original gray image by using the lifting wavelet transform: a first component CaN, a second component ChN, a third component CvN, a fourth component CdN of an N-th level, . . . , a second component ChL, a third component CvL, a fourth component CdL of a L-th level, . . . , and a second component Ch1, a third component Cv1 and a fourth component Cd1 of a first level; i.e., totally 3N+1 components are obtained, wherein N is an integer larger than or equal to 1, 1≤L≤N;

In the embodiment, the preceding level and the next level of the L-th level are determined according to the decomposition order, i.e., the (L−1)-th level is the preceding level of the L-th level, and the (L+1)-th level is the next level of the L-th level.

When N is larger than 1 and L is unequal to N, the second component ChL, the third component CvL and the fourth component CdL of the L-th level are obtained from a decomposition of the first component Ch(L−1) of the (L−1)-th level.

Figure 2:
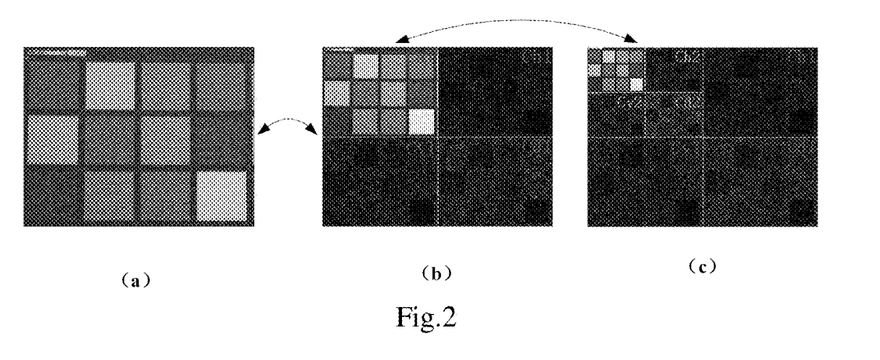
FIG. 2 is a schematic diagram of two-level decomposition in Embodiment 1.

FIG. 2 schematically illustrates a situation of two-level decomposition in the embodiment, i.e., N=2. FIG. 2(a) shows an original gray image; FIG. 2(b) shows four components obtained from one-level decomposition of the original gray image; and FIG. 2(c) shows a further decomposition of the first component Ca1 in FIG. 2(b), i.e., four components of the second level and a second component, a third component and a fourth component of the first level are obtained after two-level decomposition.

Step 102: processing each level of components one by one starting from an N-th level, so as to obtain a processed gray image.

Figure 3A:
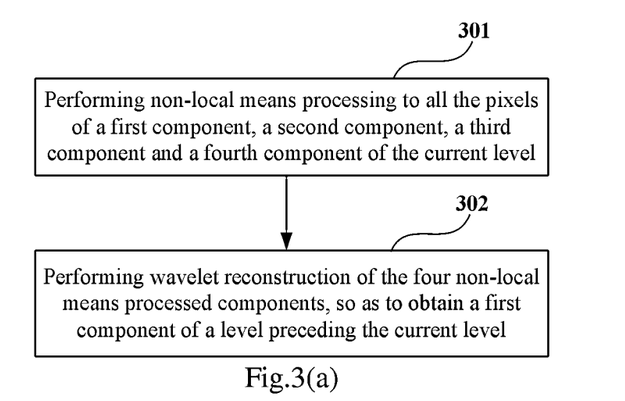
FIG. 3(a) is a flowchart of processing mode 1 in Embodiment 1.

In which, each level of components may be processed one by one in an order from the N-th level to the first level by using the non-local means method. The following modes may be adopted when processing each level of components in the N levels:

Processing mode 1:

FIG. 3(a) is a flowchart of processing mode 1 in Embodiment 1. As shown in FIG. 3(a), the processing procedure may comprise the following steps:

Step 301: performing non-local means processing to all the pixels of a first component, a second component, a third component and a fourth component of the current level, and gathering the pixel values of all the non-local means processed pixels, so as to obtain the four non-local means processed components.

Figure 3B:
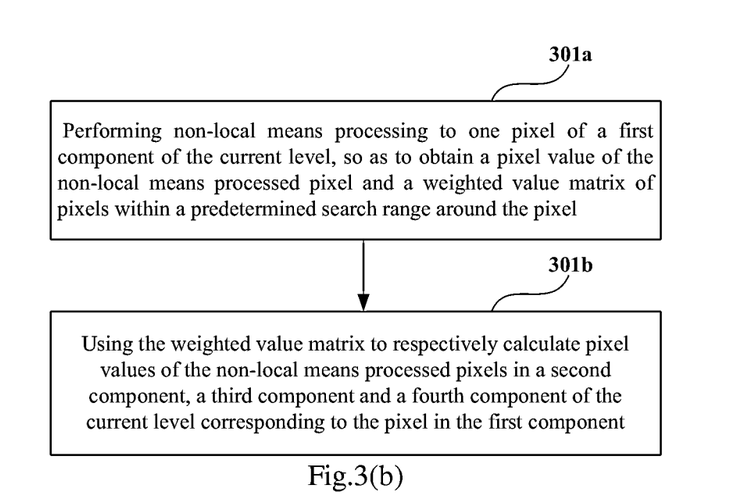
FIG. 3(b) is a flowchart of a non-local means processing of one of all the pixels in step 301 of FIG. 3(a)

In the embodiment, the non-local means processing may be performed by using a method as shown in FIG. 3(b). The processing procedure will be described as later, and herein is omitted.

Step 302: performing wavelet reconstruction of the four non-local means processed components, so as to obtain a first component of a level preceding the current level.

In the embodiment, when performing the wavelet reconstruction of the four non-local means processed components, any of the existing methods may be used, and herein is omitted. Next, the descriptions are made with reference to FIG. 6.

In the embodiment, in step 301, when performing non-local means processing to each of all the pixels of the first component, the second component, the third component and the fourth component of the current level, the method as shown in FIG. 3(b) may be used.

FIG. 3(b) is a flowchart of a non-local means processing of one of all the pixels of the first component, the second component, the third component and the fourth component of the current level in step 301 of FIG. 3(a), comprising:

Step 301a: performing non-local means processing to one pixel of the first component of the current level, so as to obtain a pixel value of the non-local means processed pixel and a weighted value matrix of pixels within a predetermined search range around the pixel, wherein the weighted value matrix is an R×R matrix, R denoting the number of the pixels within the predetermined search range, which is an integer greater than or equal to 1.

In the embodiment, when performing non-local means processing to one pixel of the first component of the current level, for example the following equations (1)-(4) may be used for the calculation, which are omitted herein.

In the embodiment, the weighted value matrix may be obtained by combining the following equation (5), which is omitted herein.

Step 301b: using the weighted value matrix to respectively calculate pixel values of the non-local means processed pixels in the second component, the third component and the fourth component of the current level corresponding to the pixel in the first component.

In the embodiment, when using the weighted value matrix to respectively calculate pixel values of the non-local means processed pixels in the second component, the third component and the fourth component of the current level corresponding to the pixel in the first component, for example the following equations (9)-(11) may be used for the calculation, which are omitted herein.

Figure 4:
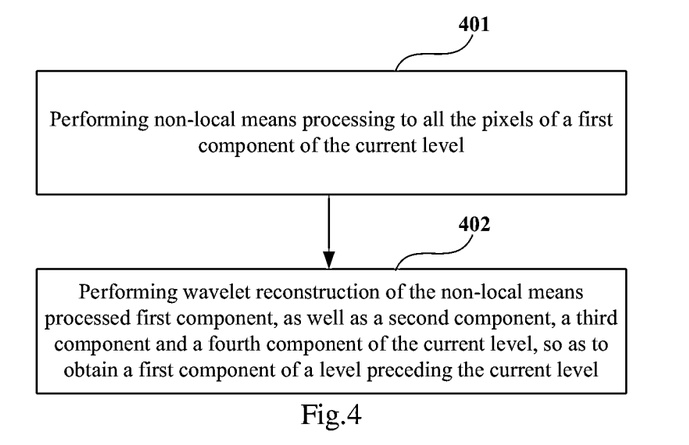
FIG. 4 is a flowchart of processing mode 2 in Embodiment 1.

Processing mode 2:

FIG. 4 is a flowchart of processing mode 2 in Embodiment 1. As shown in FIG. 4, the processing procedure may comprise the following steps:

Step 401: performing non-local means processing to all the pixels of the first component of the current level.

In the embodiment, when performing non-local means processing to all the pixels of the first component of the current level, for example the following equations (1)-(4) may be used for the calculation, which are omitted herein.

Step 402: performing wavelet reconstruction of the non-local means processed first component, as well as a second component, a third component and a fourth component of the current level, so as to obtain a first component of a level preceding the current level.

In the embodiment, when performing wavelet reconstruction of the four non-local means processed components, any of the existing modes may be used, and herein is omitted. Next, the descriptions are made with reference to FIG. 6.

In the embodiment, in step 102, when processing each level of components in the N levels, either of the above two processing modes may be used.

When N is larger than 1, the same processing mode may be used for the components of different levels in the N levels, i.e., processing mode 1 or processing mode 2 is always used when processing each level of components. In addition, different processing modes may also be used for the components of different levels in the N levels, e.g., processing mode 1 is used for the current L-th level while processing mode 2 is used for the L−1 level, and vice versa.

In the embodiment, the image denoising effect is improved with the increase of N, i.e., the increase of the decomposition level.

For the value of N, generally the image denoising requirement and the calculation complexity shall be considered comprehensively. For example, N may be 1 or 2. For example, when N=1, the components of the first level are processed by using processing mode 1. In this case, the calculation is simple and the denoising can be well done. When N=2, the components of the second level are processed by using processing mode 2, and the components of the first level are processed by using processing mode 1. In this case, a deep denoising can be carried out.

In the embodiment, the processes of decomposition and reconstruction of the gray image are briefly described with reference to FIGS. 5-8 by taking the lifting wavelet transform method as an example.

FIG. 5 is a flowchart of a decomposition of a gray image by using a lifting wavelet transform method in the embodiment. The following method may be used for the decomposition of each level.

As shown in FIG. 5, through a one-dimensional wavelet transform LWT in the longitudinal direction, a two-dimensional gray image Ca (N) is decomposed into components in odd rows and components in even rows, which are denoted as LWT_Odd and LWT_Even, respectively. Next, a one-dimensional wavelet transform in the transverse direction is performed for LWT_Odd and LWT_Even, respectively, so as to obtain four components of the next level, i.e., a first component Ca (N+1), a second component Ch (N+1), a third component Cv (N+1) and a fourth component Cd (N+1).

Figure 6:
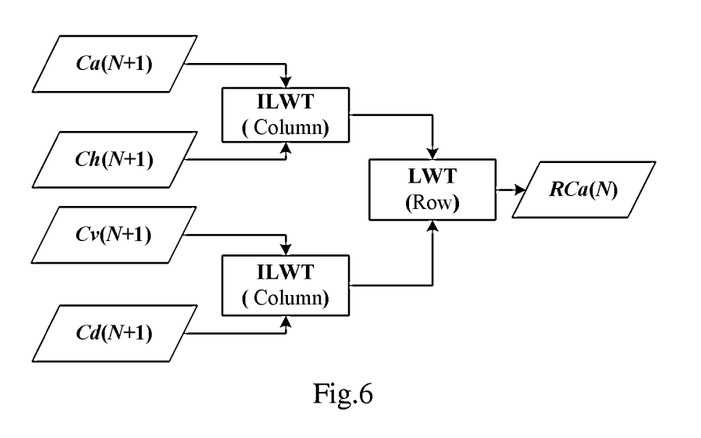
FIG. 6 is a flowchart of a reconstruction of a gray image by using a lifting wavelet transform in Embodiment 1.

FIG. 6 is a flowchart of a reconstruction of a gray image by using a lifting wavelet transform method in the embodiment. As shown in FIG. 6, a one-dimensional inverse wavelet transform ILWT in the transverse direction is performed for the first component Ca(N+1) and the second component Ch(N+1), respectively, so as to obtain ILWT_Even. Similarly, a one-dimensional inverse wavelet transform ILWT in the transverse direction is performed for the third component Cv(N+1) and the fourth component Cd(N+1), respectively, so as to obtain ILWT_Odd. Next, a one-dimensional inverse wavelet transform ILWT in the longitudinal direction is performed for LWT_Even and LWT_Odd, respectively, so as to obtain a reconstructed gray image R Ca(N).

Figure 7:
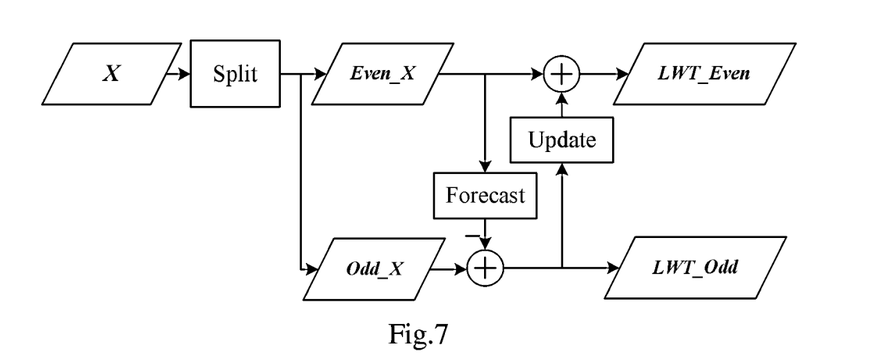
FIG. 7 is a flowchart of a one-dimensional lifting wavelet transform in FIG. 5.

FIG. 7 is a flowchart of a one-dimensional wavelet transform in FIG. 5. As shown in FIG. 5, one-dimensional vector data x is partitioned into an even component Even_x and an odd component Odd_x. The even component Even_x forecasts the odd component Odd_x. The odd component Odd_x obtains an odd component LWT_Odd of the wavelet transform based on a forecast result, and updates the even component Even_x based on the forecast result, so as to obtain an even component LWT_Even of the wavelet transform.

Figure 8:
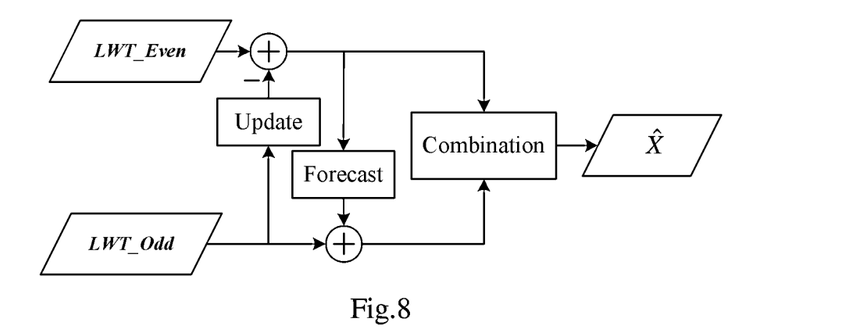
FIG. 8 is a flowchart of a one-dimensional inverse lifting wavelet transform in FIG. 6.

FIG. 8 is a flowchart of a one-dimensional inverse wavelet transform in FIG. 6. As shown in FIG. 8, the odd component LWT_Odd of the wavelet transform updates the even component LWT_Even of the wavelet transform. The even component LWT_Even of the wavelet transform forecasts the odd component LWT_Odd of the wavelet transform based on an update result, and performs a combination based on the forecast result and the update result, so as to obtain reconstructed one-dimensional vector data $\hat{x}$.

In the embodiment, the methods as shown in FIGS. 5-6 for example may be used for the decomposition in step 101 and the reconstructions in steps 302 and 402, but the embodiment is not limited thereto.

In the embodiment, the pixel value of the non-local means processed pixel, which is obtained by performing non-local means processing to one pixel of the first component of the current level, is a weighted sum of the pixel values of the pixels within the predetermined search range around the pixel, which is expressed as:

$$NL(i, j) = \sum_{n,m \in R(i,j)} x(n, m) * w(n, m); \qquad (1)$$

where, NL(i, j) denotes a pixel value of pixel (i, j) after non-local means processing, x(n,m) denotes a pixel value of pixel (n,m) within the predetermined search range, w(n,m) denotes a weighted value of pixel (n,m), R denotes the number of the pixels within the predetermined search range, i, j, n, m and R being integers greater than or equal to 1.

In the embodiment, the weighted value w(n,m) of pixel (n,m) may be calculated by using equation (2) below:

$$w(n,m) = e^{(-d(n,m)/h)} \qquad (2);$$

where, d(n,m) denotes a distance between the image block where pixel (n, m) is located and the image block where pixel (i, j) is located, and h denotes a control coefficient.

In the embodiment, the distance may be calculated in any of the existing methods.

In addition, the distance may also be calculated by using equations (3) and (4) below:

$$d(n, m) = \sum_{t=-r}^{r} \sum_{k=-r}^{r} \left( \frac{(x(i+k, j+t) - x(n+k, m+t))^2}{\left( \frac{(k^2 + t^2)^{1.25} + 0.5}{T} \right)} \right); \qquad (3)$$

$$T = \sum_{t=-r}^{r} \sum_{t=-r}^{r} \left( (k^2 + t^2)^{1.25} + 0.5 \right); \qquad (4)$$

where, r denotes the size of the image block, the image block consisting of (2r+1)×(2r+1) pixels, T denotes a normalization coefficient, k, t and r are all integers greater than or equal to 1, k≤r, t≤r, and h denotes a control coefficient.

In the embodiment, the control coefficient h is used to control the denoising effect. In order to suppress more noises, h may be set as higher and preferably between 1 and 100. For example, in the embodiment, R may be set as 10, r may be set as 3, and h may be set as 20.

In which, when the distance is calculated by using the equation (3), a normalization is performed so that the denoised image edge has a smooth transition and reserves a certain sharpness.

Figure 9:
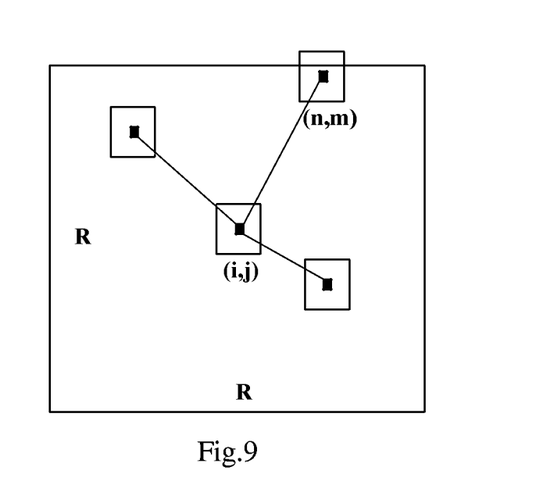
FIG. 9 is a schematic diagram of an image block matching of a non-local means method in Embodiment 1.

FIG. 9 is a schematic diagram of an image block matching of a non-local means method in the embodiment. As shown in FIG. 9, when the weighted value w(n, m) of pixel (n, m) is calculated by using the equations (2)-(4), the image block where pixel (n, m) is located is the current image block, the image block where pixel (i, j) is located is a reference image block, and d(n,m) is a distance between the current image block and the reference image block.

In step 301a, the R×R weighted value matrix can be obtained as follows:

The weighted value of each pixel within the search range is calculated by using the equations (2)-(4), so as to obtain an R×R weighted value matrix which is defined as follows:

$$W = \begin{bmatrix} w_{i-r,j-r} & w_{i-r+1,j-r} & \cdots & \cdots & w_{i-r,j+r} \\ w_{i-r+1,j-r} & \ddots & & \ddots & w_{i-r+1,j+r} \\ \vdots & & \ddots & w_{i,j} & \ddots & \vdots \\ \vdots & & \ddots & & \ddots & \vdots \\ w_{i+r,j-r} & \cdots & & \cdots & w_{i+r,j+r} \end{bmatrix}; \quad (5)$$

where, $w_{i,j}$ denotes the weighted value of pixel (i, j), r denotes the size of the image block, and i, j and r are all integers greater than or equal to 1.

In step 301b, the obtained weighted value matrix may be used to respectively calculate pixel values of the non-local means processed pixels in the second component, the third component and the fourth component of the current level corresponding to the pixel in the first component, and the pixel values of all the non-local means processed pixels may be gathered, so as to obtain the four non-local means processed components, thereby completing step 301.

In addition, after step 301a, the method may further comprise: performing normalization to the obtained weighted value matrix. Thus, in step 301b, the normalized weighted value matrix may be used to respectively calculate pixel values of the non-local means processed pixels in the second component, the third component and the fourth component of the current level corresponding to the pixel in the first component.

For example, the normalization may be performed as follows: in the R×R weighted value matrix, the weighted value $w_{i,j}$ of pixel (i, j) is the maximum, and the weighted value of the pixel (i, j) is reset, so as to perform normalization to the weighted value matrix by using equations (6)-(7) below:

$$w_{i,j} = \max(W) \quad (6);$$

$$W = W/\max(W) \quad (7);$$

w obtained by using the equation (7) is a normalized weighted value matrix. The denoising effect can be further improved through the normalization to the weighted value matrix.

In steps 301 and 401, for example the non-local means processed components can be obtained in the following method:

when the current level is the L-th level, calculations for all the pixels of the first component of the current level are performed by using the equation (1), and all the pixel values of all the non-local means processed pixels are gathered to obtain the non-local means first component of each level:

$$NLM\text{-}CaL(i, j) = \sum_{n,m \in R(i,j)} CaL(n, m) * w(n, m); \quad (8)$$

Where, NLM-CaL(i, j) denotes the non-local means first component of the L-th level, CaL(n,m) denotes the pixel value of the pixel (n,m) within the predetermined search range of the first component of the L-th level, and R denotes the number of pixels within the predetermined search range.

For each pixel of the first component of the current level, the R×R weighted value matrix is obtained by using the equation (5). Through those weighted value matrixes, the non-local means second component, third component and fourth component of the current level are calculated respectively by using the equations (9)-(11) below:

$$NLM\text{-}ChL(i, j) = \sum_{n,m \in R(i,j)} ChL(n, m) * w(n, m); \quad (9)$$

$$NLM\text{-}CvL(i, j) = \sum_{n,m \in R(i,j)} CvL(n, m) * w(n, m); \quad (10)$$

$$NLM\text{-}CdL(i, j) = \sum_{n,m \in R(i,j)} CdL(n, m) * w(n, m); \quad (11)$$

where, NLM-ChL(i, j), NLM-CvL(i, j) and NLM-CdL(i, j) respectively denote the non-local means second component, third component and fourth component of the L-th level; ChL(n,m), CvL(n,m), CdL(n,m) respectively denote the pixel values of pixels (n,m) within the predetermined search ranges of the second component, the third component and the fourth component of the L-th level. Thus the four non-local means components of the L-th level are obtained.

As can be seen from the above embodiment, by combining the wavelet transform method with the non-local means method, various image noises can be removed, and the image details can be well reserved.

Embodiment 2

Figure 10A:
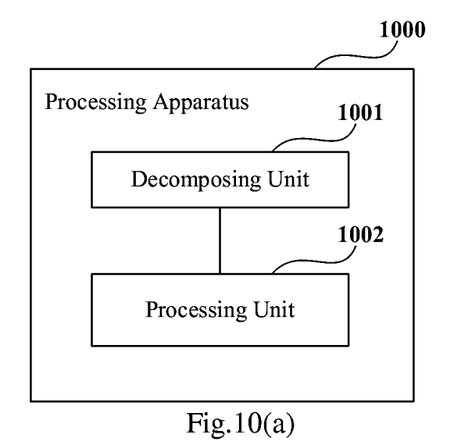
FIG. 10(a) is a structural diagram of an image processing apparatus in Embodiment 2.

FIG. 10(a) is a structural diagram of an image processing apparatus 1000 in Embodiment 2, which is corresponding to the image processing method in Embodiment 1. As shown in FIG. 10(a), the apparatus 1000 comprises:

a decomposing unit 1001 configured to perform N-level decomposition of an original gray image by using a wavelet transform method; and a processing unit 1002 configured to process each level of components one by one starting from an N-th level, so as to obtain a processed gray image;

wherein the processing each level of components in N levels by the processing unit 1002 comprises:

Processing mode 1:

performing non-local means processing to all the pixels of a first component, a second component, a third component and a fourth component of the current level, and performing wavelet reconstruction to the four non-local means processed component, so as to obtain a first component of a level preceding the current level;

wherein the performing non-local means processing to one of all the pixels of a first component, a second component, a third component and a fourth component of the current level comprises:

performing non-local means processing to one pixel of the first component of the current level, so as to obtain a pixel value of the non-local means processed pixel and a weighted value matrix of pixels within a predetermined search range around the pixel, wherein the weighted value matrix is an R×R matrix, R denoting the number of the pixels within the predetermined search range, which is an integer greater than or equal to 1; and using the weighted value matrix to respectively calculate pixel values of the non-local means processed pixels in the second component, the third component and the fourth component of the current level corresponding to the pixel in the first component; or Processing mode 2:

performing non-local means processing to all the pixels of the first component of the current level, and performing wavelet reconstruction to the non-local means processed first component as well as a second component, a third component and a fourth component of the current level, so as to obtain a first component of a level preceding the current level;

wherein N is greater than or equal to 1, and when the current level is the N-th level, the first component of the current level is a first component obtained after the N-th level decomposition; and when N is greater than 1 and the current level is not the N-th level, the first component of the current level is a first component obtained after processing a component of a level next to the current level.

In the embodiment, when processing each level of components in the N levels by the processing unit 1002, either of the above two processing modes may be used.

When N is larger than 1, the same processing mode may be used for the components of different levels in the N levels, i.e., processing mode 1 or processing mode 2 is always used when processing each level of components. In addition, different processing modes may also be used for the components of different levels in the N levels, e.g., processing mode 1 is used for the current L-th level while processing mode 2 is used for the (L-1)-th level, and vice versa.

In the embodiment, the image denoising effect is improved with the increase of N, i.e., the increase of the decomposition level.

For the value of N, generally the image denoising requirement and the calculation complexity shall be considered comprehensively. For example, N may be 1 or 2. For example, when N=1, the components of the first level are processed by using processing mode 1. In that case, the calculation is simple and the denoising can be well done. When N=2, the components of the second level are processed by using processing mode 2, and the components of the first level are processed by using processing mode 1. In that case, a deep denoising can be carried out.

In the embodiment, the method for the decomposing unit 1001 to perform N-level decomposition of the original gray image by using a wavelet transform method, and processing mode 1 or 2 used by the processing unit 1002 to process each level of components one by one starting from the N-th level, are the same as those described in Embodiment 1, and herein are omitted.

Figure 10B:
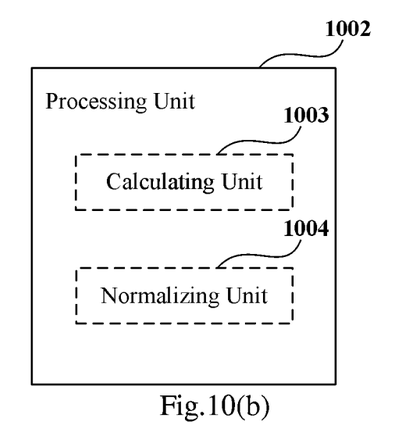
FIG. 10(b) is a structural diagram of a processing unit of an image processing apparatus in FIG. 10(a)

FIG. 10(b) is a structural diagram of a processing unit 1002 of the image processing apparatus 1000 in FIG. 10(a). As shown in FIG. 10(b), the processing unit 1002 may further comprise a calculating unit 1003 and a normalizing unit 1004, wherein the calculating unit 1003 calculates a distance between an image block where the pixel is located and an image block where a certain pixel within a search range around the pixel is located by using the equations (3)-(4) in Embodiment 1, and the normalizing unit 1004 performs normalization to the weighted value matrix by using the equations (6)-(7) in Embodiment 1.

In which, the calculating unit 1003 and the normalizing unit 1004 are optional parts, and represented with dotted boxes in FIG. 10(b).

As can be seen from the above embodiment, by combining the wavelet transform method with the non-local means method, various image noises can be removed, and the image details can be well reserved.

Embodiment 3

Figure 11:
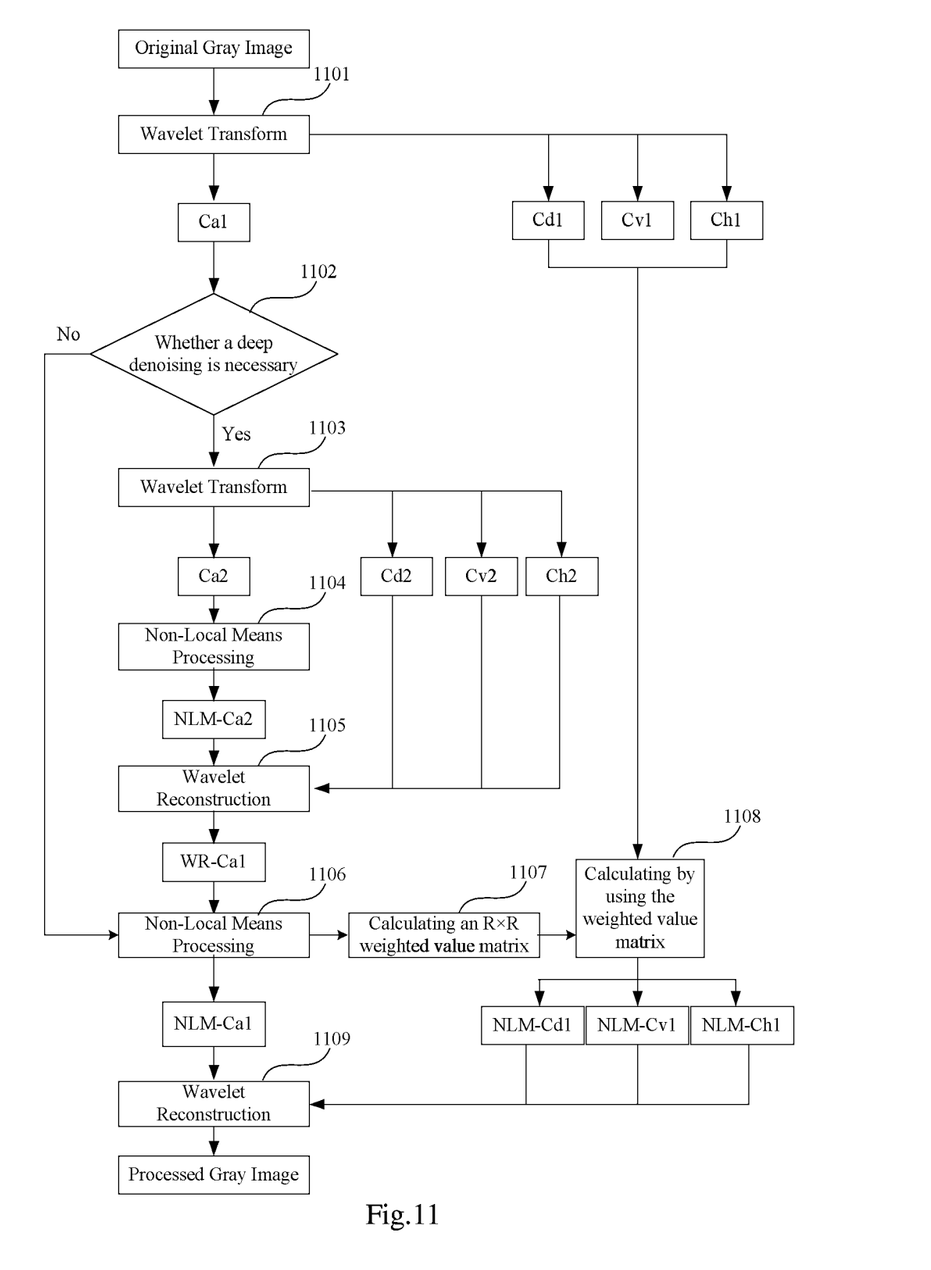
FIG. 11 is a flowchart of an image processing method in Embodiment 3.

FIG. 11 is a flowchart of an image processing method in Embodiment 3, which illustrates the application example when N=1 or 2 in Embodiment 1. As shown in FIG. 11, the method comprises:

Step 1101: performing a decomposition of an original gray image by using a wavelet transform method, so as to obtain four components after the decomposition of a first level, i.e., a first component Ca1, a second component Ch1, a third component Cv1 and a fourth component Cd1.

In which, the method for performing a decomposition by using a wavelet transform method is the same as that in Embodiment 1, and herein is omitted.

Step 1102: judging whether a deep denoising is necessary, and if so, entering step 1103 (i.e., a case where N=2), while if not, directly entering step 1106 ((i.e., a case where N=1).

Step 1103: if a deep denoising is necessary, further performing a decomposition of the first component Ca1 by using the wavelet transform method, so as to obtain four components after the decomposition of a second level, i.e., a first component Ca2, a second component Ch2, a third component Cv2 and a fourth component Cd2.

Step 1104: performing a non-local means processing to the first component Ca2, so as to obtain a non-local means processed first component NLM-Ca2.

In which, the non-local means processed pixel value of each pixel in the first component Ca2 is calculated by using equations (1)-(4) in Embodiment 1, so as to obtain the non-local means processed first component NLM-Ca2, wherein, for example R may be set as 7, r may be set as 2, and h may be set as 20.

Step 1105: performing a wavelet reconstruction based on the non-local means first component NLM-Ca2, the second component Ch2, the third component Cv2 and the fourth component Cd2, so as to obtain a reconstructed first component WR-Ca1.

In which, the method for performing wavelet reconstruction is the same as that in Embodiment 1, and herein is omitted.

Step 1106: if it is judged in step 1102 that a deep denoising is necessary, performing non-local means processing to the reconstructed first component WR-Ca1, so as to obtain a non-local means processed first component NLM-Ca1; if it is judged in step 1102 that a deep denoising is unnecessary, directly performing non-local means processing to the first component Ca1, so as also to obtain a non-local means processed first component NLM-Ca1.

In which, similarly, the non-local means processed pixel value of each pixel in the reconstructed first component WR-Ca1 or first component Ca1 by using the equations (1)-(4) in Embodiment 1, so as to obtain the non-local means processed first component NLM-Ca1, wherein, for example R may be set as 10, r may be set as 3, and h may be set as 20.

Step 1107: during the non-local means processing performed in step 1106, the non-local means processed pixel value of each pixel in the reconstructed first component WR-Ca1 or first component Ca1 is obtained; for one of the pixels, the R×R weighted value matrix representing the weighted values of various pixels within a search range around the pixel by using the equation (5) in Embodiment 1. The operation is repeated for all the pixels to obtain the R×R weighted value matrix corresponding to each pixel in the reconstructed first component WR-Ca1 or first component Ca1.

Step 1108: calculating a non-local means processed second component NLM-Cd1, a non-local means processed third component NLM-Cv1 and a non-local means processed fourth component NLM-Ch1 by using the obtained R×R weighted value matrixes and the equations (9)-(11) in Embodiment 1.

Step 1109: performing a wavelet reconstruction based on the non-local means first component NLM-Ca1 obtained in step 1106, as well as the non-local means processed second component NLM-Cd1, the non-local means processed third component NLM-Cv1 and the non-local means processed fourth component NLM-Ch1 obtained in step 1108, so as to obtain the processed gray image.

In the embodiment, it is judged whether a deep denoising is necessary during the N-level decomposition, and a decomposition of a next level is performed only when it is judged that a deep denoising is necessary. But the embodiment is not limited thereto, for example, the decomposition may be preset as having N levels, then 3N+1 components are obtained after performing all the N-level decompositions. The 3N+1 components are stored and used to perform processing level by level.

As can be seen from the above embodiment, by combining the wavelet transform method with the non-local means method, various image noises can be removed, and the image details can be well reserved.

Embodiment 4

Figure 12:
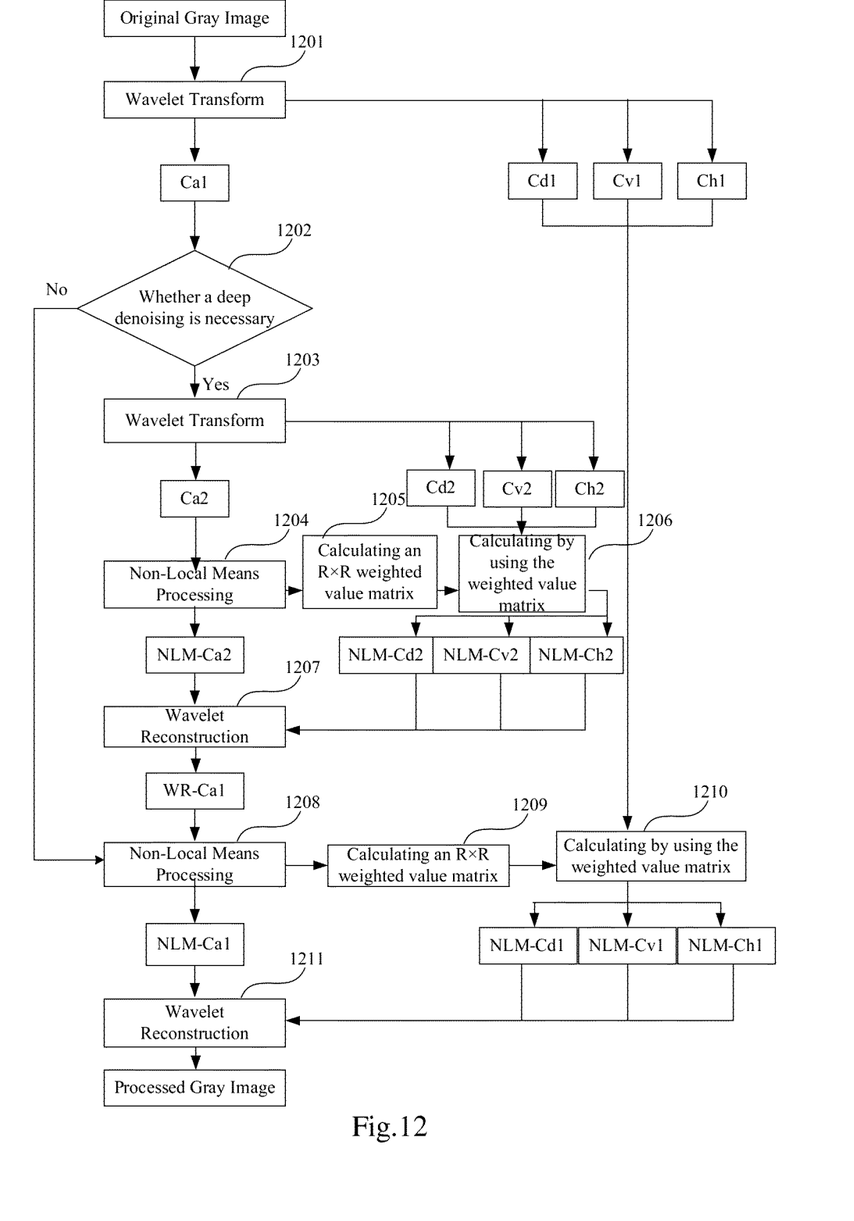
FIG. 12 is a flowchart of an image processing method in Embodiment 4.

FIG. 12 is a flowchart of an image processing method in Embodiment 4, which illustrates the application example when N=1 or 2 in Embodiment 1. The difference only lies in that when a processing of a second level is performed, Embodiment 3 uses processing mode 2 in step 102 of Embodiment 1, while Embodiment 4 uses processing mode 1. As shown in FIG. 12, the method comprises:

Step 1201: performing a decomposition of an original gray image by using a wavelet transform method, so as to obtain four components after the decomposition of a first level, i.e., a first component Ca1, a second component Ch1, a third component Cv1 and a fourth component Cd1.

In which, the method for performing a decomposition by using a wavelet transform is the same as that in Embodiment 1, and herein is omitted.

Step 1202: judging whether a deep denoising is necessary, and if so, entering step 1203 (i.e., a case where N=2), while if not, directly entering step 1208 ((i.e., a case where N=1).

Step 1203: if a deep denoising is necessary, further performing a decomposition of the first component Ca1 by using the wavelet transform method, so as to obtain four components after the decomposition of a second level, i.e., a first component Ca2, a second component Ch2, a third component Cv2 and a fourth component Cd2.

Step 1204: performing a non-local means processing to the first component Ca2, so as to obtain a non-local means processed first component NLM-Ca2.

Step 1205: during the non-local means processing performed in step 1204, the non-local means processed pixel value of each pixel in the first component Ca2 is obtained; for one of the pixels, the R×R weighted value matrix representing the weighted values of various pixels within a search range around the pixel by using equation (5) in Embodiment 1; the operation is repeated for all the pixels so as to obtain the R×R weighted value matrix corresponding to each pixel in the first component Ca2.

Step 1206: respectively calculating a non-local means processed second component NLM-Cd2, a non-local means processed third component NLM-Cv2 and a non-local means processed fourth component NLM-Ch2 by using the equations (9)-(11) in Embodiment 1.

Step 1207: performing a wavelet reconstruction based on the non-local means processed first component NLM-Ca2 obtained in step 1204, as well as the non-local means processed second component NLM-Cd2, the non-local means processed third component NLM-Cv2 and the non-local means processed fourth component NLM-Ch2 obtained in step 1206, so as to obtain the reconstructed first component WR-Ca1.

Steps 1208-1211 are the same as steps 1106-1109 in Embodiment 3, and herein are omitted. After step 1211, the processed gray image is obtained.

As can be seen from the above embodiment, by combining the wavelet transform method with the non-local means method, various image noises can be removed, and the image details can be well reserved.

Embodiment 5

Figure 13:
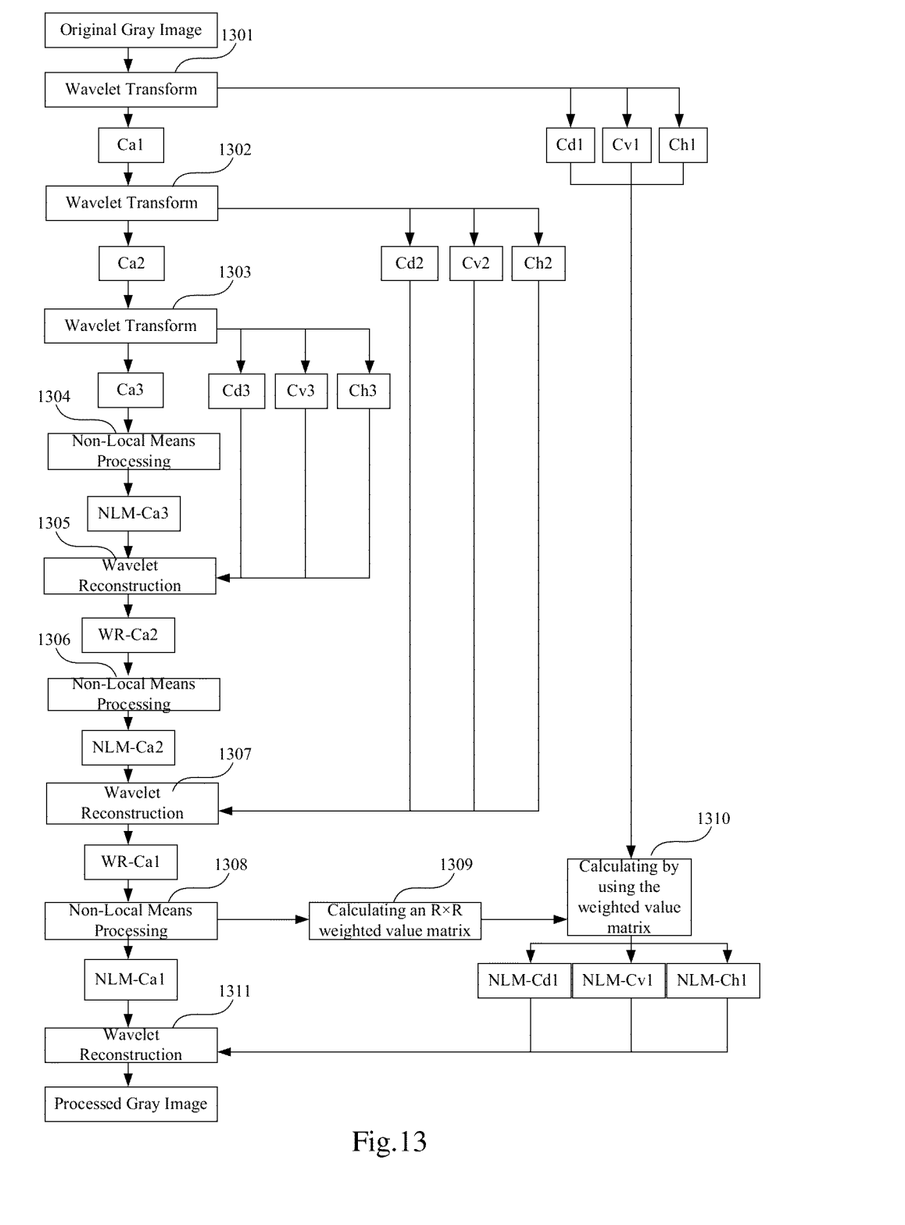
FIG. 13 is a flowchart of an image processing method in Embodiment 5.

FIG. 13 is a flowchart of an image processing method in Embodiment 5, which illustrates the application example when N=3 in Embodiment 1, wherein processing mode 2 in step 102 of Embodiment 1 is used to perform the processing of a second and third levels, and processing mode 1 is used to perform the processing of a first level. As shown in FIG. 13, the method comprises:

Step 1301: performing a decomposition of an original gray image by using a wavelet transform method, so as to obtain four components after the decomposition of level 1, i.e., a first component Ca1, a second component Ch1, a third component Cv1 and a fourth component Cd1.

Step 1302: performing a decomposition of the first component Ca1 by still using a wavelet transform method, so as to obtain four components after the decomposition of a second level, i.e., a first component Ca2, a second component Ch2, a third component Cv2 and a fourth component Cd2.

Step 1303: performing a decomposition of the first component Ca2 by further using a wavelet transform method, so as to obtain four components after the decomposition of a third level, i.e., a first component Ca3, a second component Ch3, a third component Cv3 and a fourth component Cd3.

In which, the method for performing a decomposition by using a wavelet transform is the same as that in Embodiment 1, and herein is omitted.

Step 1304: performing a non-local means processing to the first component Ca3, so as to obtain a non-local means processed first component NLM-Ca3.

In which, the non-local means processed pixel value of each pixel in the first component Ca3 is calculated by using the equations (1)-(4) in Embodiment 1, so as to obtain the non-local means processed first component NLM-Ca3.

Step 1305: performing a wavelet reconstruction based on the non-local means processed first component NLM-Ca3, as well as the second component Ch3, the third component Cv3 and the fourth component Cd3, so as to obtain the reconstructed first component WR-Ca2.

In which, the method for performing the wavelet reconstruction is the same as that in Embodiment 1, and herein is omitted.

Step 1306: performing a non-local means processing of the reconstructed first component WR-Ca2, so as to obtain a non-local means processed first component NLM-Ca2.

In which, the non-local means processed pixel value of each pixel in the first component Ca2 is calculated by using the equations (1)-(4) in Embodiment 1, so as to obtain the non-local means processed first component NLM-Ca2.

Step 1307: performing a wavelet reconstruction based on the non-local means processed first component NLM-Ca2, as well as the second component Ch2, the third component Cv2 and the fourth component Cd2, so as to obtain the reconstructed first component WR-Ca1.

Steps 1308-1311 are the same as steps 1106-1109 in Embodiment 3, and herein are omitted. After step 1311, the processed gray image is obtained.

In addition, as a modification to the embodiment, processing mode 2 in step 102 of Embodiment 1 is used to process the components of the third level, and processing mode 1 is used to process the components of the second and first levels. Moreover, processing mode 1 or 2 may be always used to process the components of the first level, the second level and the third level.

In addition, when N is larger than 3, processing mode 2 in step 102 of Embodiment 1 is used to process the components form the N-th level to the second level, and processing mode 1 is used to process the components of the first level. Moreover, processing modes 1 and 2 in step 102 of Embodiment 1 may be alternatively used to process the components of different levels.

The above situations are just given for exemplary descriptions, and the embodiments are not limited thereto.

As can be seen from the above embodiment, by combining the wavelet transform with the non-local means method, various image noises can be removed, and the image details can be well reserved.

The above apparatuses and methods of the embodiment may be implemented by hardware, or a combination of hardware and software. The embodiments relate to a computer readable program which when being executed by a logic part, enables the logic part to implement the aforementioned apparatuses or constituent parts, or enables the logic part to implement the aforementioned methods or steps. The embodiments further relate to a storage medium for storing the above program, such as hard disc, magnetic disc, optical disc, DVD, flash memory, etc.

The embodiments is described as above in conjunction with the particular embodiments. But a person skilled in the art shall appreciate that those descriptions are just exemplary, rather than limitations to the protection scope of the embodiments. A person skilled in the art can make various modifications and changes to the embodiments based on the spirit and the principle of the embodiments, and those modifications and changes also fall within the scope of the embodiments.

What is claimed is:

1. A gray image processing method, comprising:
performing N-level decomposition of an original gray image by using a wavelet transform method; and
processing each level of components one by one starting from an N-th level, to obtain a processed gray image;
wherein the processing each level of components in N levels comprises:
performing non-local means processing to all pixels of a first component, a second component, a third component and a fourth component of a current level, and performing wavelet reconstruction of the four non-local means processed components, to obtain a first component of a level preceding the current level;
wherein the performing non-local means processing to one of all the pixels of a first component, a second component, a third component and a fourth component of the current level comprises:
performing non-local means processing to one pixel of the first component of the current level, to obtain a pixel value of the non-local means processed pixel and a weighted value matrix of pixels within a predetermined search range around the pixel, wherein the weighted value matrix is an R×R matrix, R denoting the number of the pixels within the predetermined search range, which is an integer greater than or equal to 1; and
using the weighted value matrix to respectively calculate pixel values of the non-local means processed pixels in the second component, the third component and the fourth component of the current level corresponding to the pixel in the first component;
or the processing each level of components in the N levels comprises:
performing non-local means processing to all the pixels of the first component of the current level, and performing wavelet reconstruction of the non-local means processed first component, second component, third component and fourth component, to obtain a first component of a level preceding the current level;
wherein N is greater than or equal to 1, and when the current level is the N-th level, the first component of the current level is a first component obtained after the N-th level decomposition; and when N is greater than 1 and the current level is not the N-th level, the first component of the current level is a first component obtained after processing a component of a level next to the current level;
and when N is greater than 1, manners for processing the components of different levels in the N levels are identical or different.

2. The method according to claim 1, wherein, the pixel value of the non-local means processed pixel is a weighted sum of the pixel values of the pixels within the predetermined search range around the pixel, which is expressed by formula (1) below:

$$NL(i, j) = \sum_{n,m \in R(i,j)} x(n, m) * w(n, m); \qquad (1)$$

where, NL(i, j) denotes a pixel value of pixel (i, j) after non-local means processing, x(n, m) denotes a pixel value of pixel (n,m) within the predetermined search range, w(n, m) denotes a weighted value of pixel (n, m), R denotes the number of the pixels within the predetermined search range, i, j, n, m and R being integers greater than or equal to 1;
wherein the weighted values of the pixels are obtained by using distances between the image blocks where the pixels are located and the image block where the pixel is located, and normalization is performed in calculating the distances.

3. The method according to claim 2, wherein,
the distances are calculated by using formulas (2) and (3) below:

$$d(n, m) = \sum_{t=-r}^{r}\sum_{k=-r}^{r}\left(\frac{(x(i+k, j+t) - x(n+k, m+t))^2}{\left(\frac{(k^2+t^2)^{1.25}+0.5}{T}\right)}\right); \quad (2)$$

$$T = \sum_{t=-r}^{r}\sum_{k=-r}^{r}((k^2+t^2)^{1.25}+0.5); \quad (3)$$

where, d(n,m) denotes the distance between the image block where pixel (n, m) is located and the image block where pixel (i, j) is located, r denotes the size of the image block, the image block consisting of (2r+1)×(2r+1) pixels, T denotes a normalization coefficient, k, t and r are all integers greater than or equal to 1, and k≤r, t≤r.

4. The method according to claim 1, wherein after performing non-local means processing to one pixel of the first component of the current level, to obtain a pixel value of the non-local means processed pixel and a weighted value matrix of the pixels within a predetermined search range around the pixel, the method further comprises:
performing normalization to the weighted value matrix;
and the using the weighted value matrix to respectively calculate pixel values of the non-local means processed pixels in the second component, the third component and the fourth component of the current level corresponding to the pixel in the first component, comprises:
using the normalized weighted value matrix to respectively calculate pixel values of the non-local means processed pixels in the second component, the third component and the fourth component of the current level corresponding to the pixel in the first component.

5. The method according to claim 2, wherein after performing non-local means processing to one pixel of the first component of the current level, to obtain a pixel value of the non-local means processed pixel and a weighted value matrix of the pixels within a predetermined search range around the pixel, the method further comprises:
performing normalization to the weighted value matrix;
and the using the weighted value matrix to respectively calculate pixel values of the non-local means processed pixels in the second component, the third component and the fourth component of the current level corresponding to the pixel in the first component, comprises:
using the normalized weighted value matrix to respectively calculate pixel values of the non-local means processed pixels in the second component, the third component and the fourth component of the current level corresponding to the pixel in the first component.

6. The method according to claim 3, wherein after performing non-local means processing to one pixel of the first component of the current level, to obtain a pixel value of the non-local means processed pixel and a weighted value matrix of the pixels within a predetermined search range around the pixel, the method further comprises:
performing normalization to the weighted value matrix;
and the using the weighted value matrix to respectively calculate pixel values of the non-local means processed pixels in the second component, the third component and the fourth component of the current level corresponding to the pixel in the first component, comprises:
using the normalized weighted value matrix to respectively calculate pixel values of the non-local means processed pixels in the second component, the third component and the fourth component of the current level corresponding to the pixel in the first component.

7. The method according to claim 1, wherein N is equal to 1 or 2.

8. The method according to claim 2, wherein N is equal to 1 or 2.

9. The method according to claim 3, wherein N is equal to 1 or 2.

10. The method according to claim 4, wherein N is equal to 1 or 2.

11. A gray image processing apparatus, comprising:
a decomposing unit configured to perform N-level decomposition of an original gray image by using a wavelet transform method; and
a processing unit configured to process each level of components one by one starting from an N-th level, to obtain a processed gray image;
wherein the processing each level of components in N levels by the processing unit comprises:
performing non-local means processing to all pixels of a first component, a second component, a third component and a fourth component of a current level, and performing wavelet reconstruction of the four non-local means processed components, to obtain a first component of a level preceding the current level;
wherein the performing non-local means processing to one of all the pixels of a first component, a second component, a third component and a fourth component of the current level by the processing unit comprises:
performing non-local means processing to one pixel of the first component of the current level, to obtain a pixel value of the non-local means processed pixel and a weighted value matrix of pixels within a predetermined search range around the pixel, wherein the weighted value matrix is an R×R matrix, R denoting the number of the pixels within the predetermined search range, which is an integer greater than or equal to 1; and
using the weighted value matrix to respectively calculate pixel values of the non-local means processed pixels in the second component, the third component and the fourth component of the current level corresponding to the pixel in the first component;
or the processing each level of components in the N levels by the processing unit comprises:
performing non-local means processing to all pixels of the first component of the current level, and performing wavelet reconstruction of the non-local means processed first component, second component, third component and fourth component, to obtain a first component of a level preceding the current level;
when N is greater than or equal to 1 and the current level is the N-th level, the first component of the current level is a first component obtained after the N-th level decomposition; and when N is greater than 1 and the current level is not the N-th level, the first component of the current level is a first component obtained after processing a component of a level next to the current level;
and when N is greater than 1, manners for processing the components of different levels in the N levels are identical or different.

12. The apparatus according to claim 11, wherein the processing unit comprises:
a calculating unit configured to calculate the pixel value of the non-local means processed pixel, the pixel value of the non-local means processed pixel being a weighted sum of the pixel values of the pixels within the predetermined search range around the pixel, which is expressed by formula (1) below:

$$NL(i, j) = \sum_{n,m \in R(i,j)} x(n, m) * w(n, m); \quad (1)$$

where, NL(i, j) denotes a pixel value of pixel (i, j) after non-local means processing, x(n, m) denotes a pixel value of pixel (n,m) within the predetermined search range, w(n, m) denotes a weighted value of pixel (n, m), R denotes the number of the pixels within the predetermined search range, i, j, n, m and R being integers greater than or equal to 1;

wherein the calculating unit obtains the weighted values of the pixels by using distances between the image blocks where the pixels are located and the image block where the pixel is located, and performs normalization in calculating the distances.

13. The apparatus according to claim 12, wherein, the calculating unit calculates the distances by using formulas (2) and (3) below:

$$d(n, m) = \sum_{t=-r}^{r} \sum_{k=-r}^{r} \left( \frac{(x(i+k, j+t) - x(n+k, m+t))^2}{\left( \frac{(k^2 + t^2)^{1.25} + 0.5}{T} \right)} \right) \quad (2)$$

$$T = \sum_{t=-r}^{r} \sum_{k=-r}^{r} \left( (k^2 + t^2)^{1.25} + 0.5 \right) \quad (3)$$

where, d(n,m) denotes the distance between the image block where pixel (n,m) is located and the image block where pixel (i, j) is located, r denotes the size of the image block, the image block consisting of (2r+1)×(2r+1) pixels, T denotes a normalization coefficient, k, t and r are all integers greater than or equal to 1, and k≤r, t≤r.

14. The apparatus according to claim 11, wherein the processing unit further comprises:
a normalizing unit configured to perform normalization to the weighted value matrix;
and the using the weighted value matrix to respectively calculate pixel values of the non-local means processed pixels in the second component, the third component and the fourth component of the current level corresponding to the pixel in the first component, comprises: using the normalized weighted value matrix to respectively calculate pixel values of the non-local means processed pixels in the second component, the third component and the fourth component of the current level corresponding to the pixel in the first component.

15. The apparatus according to claim 12, wherein the processing unit further comprises:
a normalizing unit configured to perform normalization to the weighted value matrix;
and the using the weighted value matrix to respectively calculate pixel values of the non-local means processed pixels in the second component, the third component and the fourth component of the current level corresponding to the pixel in the first component, comprises: using the normalized weighted value matrix to respectively calculate pixel values of the non-local means processed pixels in the second component, the third component and the fourth component of the current level corresponding to the pixel in the first component.

16. The apparatus according to claim 13, wherein the processing unit further comprises:
a normalizing unit configured to perform normalization to the weighted value matrix;
and the using the weighted value matrix to respectively calculate pixel values of the non-local means processed pixels in the second component, the third component and the fourth component of the current level corresponding to the pixel in the first component, comprises: using the normalized weighted value matrix to respectively calculate pixel values of the non-local means processed pixels in the second component, the third component and the fourth component of the current level corresponding to the pixel in the first component.

17. The apparatus according to claim 11, wherein N is equal to 1 or 2.

18. The apparatus according to claim 12, wherein N is equal to 1 or 2.

19. The apparatus according to claim 13, wherein N is equal to 1 or 2.

20. The apparatus according to claim 14, wherein N is equal to 1 or 2.

* * * * *